United States Patent Office 3,441,412
Patented Apr. 29, 1969

3,441,412
PHOTOGRAPHIC SILVER HALIDE MATERIAL CONTAINING CARBOXYALKYLATED DEXTRIN
Wolfgang Himmelmann and Franz Moll, Cologne-Stammheim, Rolf-Fred Posse, Cologne-Flittard, and Alexander Riebel and Hans Ulrich, Leverkusen, Germany, assignors to Agfa Aktiengesellschaft, Leverkusen, Germany, a corporation of Germany
No Drawing. Filed Dec. 16, 1964, Ser. No. 418,918
Claims priority, application Germany, Dec. 27, 1963, A 44,892
Int. Cl. G03c 1/06
U.S. Cl. 96—94                    5 Claims

ABSTRACT OF THE DISCLOSURE

This invention relates to photographic gelatin silver halide emulsions and auxiliary layers containing carboxyalkylated dextrin to improve covering power.

---

This invention relates to photographic gelatin silver halide emulsions and to photographic auxiliary layers whose photographic and mechanical properties are improved by the addition of water-soluble reaction products of halogen carboxylic acids with starch, starch derivatives or, especially, dextrins.

It is common practice to add natural or synthetic polymers to photographic gelatin silver halide layers in order to modify the physical properties of the gelatin, especially to remove its brittleness. These additives, however, impair other properties of gelatin. For example, the permeability of the layers to the treatment baths is impaired, the drying times are often increased and the strength and hardness of the film surface are reduced. There have therefore been many attempts to find polymers which would improve the photographic properties of gelatin without impairing the physical properties. It is known, for example, to add dextrins to the photographic gelatin-containing emulsions to increase the sensitivity and to improve development and fixing, whereby the white parts of the image remain clear and the black parts become more intense. Apart from dextrin, gum arabic, starch and other polysaccharide derivatives such as agar-agar and sugar have been added to the emulsions with the aim of increasing the covering power of developed silver and improving the maximum density. The addition of dextrins, however, causes the smooth surface to become rough after processing and the layers in the transparency become matt. In addition, as a result of the conditions of preparation, dextrins cannot be used for highly sensitive emulsions because fogging may occur after a brief storage time.

These disadvantages are eliminated if low-molecular dextrins with special physical properties are used. These dextrins are, however, less effective since they separate from gelatin owing to their low molecular weight.

An object of this invention is to provide improved photographic gelatino silver halide emulsions covering power and increased speed. Still another object is to provide photographic elements containing layers of such silver halide emulsions.

We now have found that silver halide gelatin emulsions of increased covering power of the developed silver and enhanced photographic properties can be made by adding to the emulsions an effective amount of water soluble reaction products of water soluble starch, starch derivatives or preferably dextrin with halogenated carboxylic acids. The emulsion contains 5 to 50% preferably 15 to 30% based on the weight of gelatin of the above reaction products. The reaction products are homogeneously distributed in the gelatin layer.

The water soluble starch used in starting compounds should preferably have a molecular weight of at least 1000. As starch derivatives are suitable esters or ethers of starch in particular with lower aliphatic acids or alcohols having up to 5 carbon atoms such as starch methyl ether or starch ethyl ether. The dextrins useful for the above reaction, are produced according to common practice by hydrolysis of starch by diluted acids, diastase, ferments or dry heat. As reaction components for the above carbohydrates are preferably used aliphatic halogen carboxylic acids, in particular chloro or bromo aliphatic carboxylic acids having up to 5 carbon atoms such as chloro or bromo acetic acid or α- or β-chlorpropionic acid.

The resulting reaction products have a carboxylic group content of between 3 and 20%, preferably between about 5 and 15%.

Due to this content of carboxyl groups the reaction products of the present invention are extremely water-soluble and easily miscible with gelatin even in the dried state. As they are of high molecular weight, they do not diffuse to any significant extent out of the gelatin layers. In contrast to such layers to which dextrins have been added which have a rough and matt surface, the surfaces of the emulsion layers containing the compounds according to the invention are smooth after processing and the layers themselves are transparent.

The preparation of the reaction products of dextrins or starch or starch derivatives with halogen carboxylic acids is not difficult. The following general procedure can be used to produce the products of the present invention: Water-soluble starch, starch derivatives or dextrin are reacted in aqueous solution at temperatures between 10 and 30° C. with a halogen carboxylic acid in the presence of caustic soda solution for a time of about 30 minutes. After the reaction has been completed by heating for 45 minutes at 60 to 80° C., the mixture is neutralized with hydrochloric acid and the reaction product precipitated with alcohol or acetone.

The quantity of halogen carboxylic acid used may be varied within wide limits.

The production of specific compounds is described in the following in detail:

Compound I 100 g. of dextrin are dissolved with stirring in
100 cc. of water and made alkaline with
250 g. of concentrated caustic soda solution,
100 g. of mono-chloroacetic acid are added in portions in the course of 30 minutes with vigorous stirring. At the same time, the temperature is kept below 22° C. The mixture is heated to 80° C. with constant stirring in an atmosphere of nitrogen and left at this temperature for 45 minutes. The mixture is then cooled and adjusted to pH 6 to 7 with concentrated hydrochloric acid. After filtration, the substance is precipitated with 700 cc. of methanol and washed with methanol. A 20% solution is prepared. A product having a carboxyl group content of 10.1% is obtained.

Compound II

Using a similar reaction mixture, only the time and the temperature of after-heating are changed. Heating is at 60° C. for 30 minutes. A product having a carboxyl group content of 7.3% is obtained.

Compound III

The reaction is carried out as described under Compound I. The following quantities are used:

| | |
|---|---|
| Dextrin | g-- 100 |
| Water | cc-- 500 |
| Conc. caustic soda solution | g-- 250 |
| Monochloroacetic acid | g-- 50 |

The reaction product obtained has a carboxyl group content of 5.2%.

Compound IV

The compound is prepared in the same way as Compound I except that α-chloropropionic acid is used instead of the chloroacetic acid. The reaction product obtained has a carboxyl group content of 3.3%.

Compound V

The compound is prepared in the same way as Compound I except that bromoacetic acid is used instead of the chloroacetic acid. In addition, the reaction product is reprecipitated twice from water with methanol. The product has a carboxyl group content of 11%.

Compound VI 50 g. of water-soluble starch are suspended in
200 cc. of water and
125 g. of conc. caustic soda solution are added.
50 g. of monochloroacetic acid are added in portions in the course of 30 minutes. During the addition, the temperature is kept below 22° C. The mixture is then heated to 60° for 30 minutes in an atmosphere of nitrogen. The reaction product is precipitated with methanol and dissolved in water to a 20% solution. The solution is light yellow in color. The compound contains 11% of carboxyl groups.

Compound VII 50 g. of starch methyl ether (methoxyl group content 16%) are dissolved in 300 cc. of water and
125 g. of caustic soda solution (conc.) are added. After addition of
50 g. of monochloroacetic acid in portions, the reaction mixture is worked up under the same conditions as in the case of Compound VI. The compound obtained contains 13% of carboxyl groups.

Compound VIII 50 g. of dextrin are dissolved in
50 cc. of water and
125 cc. of conc. caustic soda solution are added to the solution
50 g. of 3-chloropropionic acid are added with a spatula in the course of 30 minutes at 20° C. with stirring. The mixture is then heated for 10 hours at 80° C. The dark brown reaction mixture is neutralized with hydrochloric acid, precipitated with methanol, washed and again dissolved in water. (20% solution.) The product contains 6.9% of carboxyl groups.

The preparation of photographic silver halide emulsions includes 3 separate steps: (1) emulsification and physical ripening which is also called Ostwald ripening; (2) the freeing of the emulsion of excess water soluble salts, usually by washing with water and drying; and (3) the after-ripening which is also called chemical ripening to obtain increased emulsion speed or general sensitivity.

The reaction products of the present invention can be incorporated into the silver halide gelatin emulsion at any stage after precipitation of the silver halide grains in the gelatin. Preferably, however, after the after-ripening step.

The reaction products of the present invention are particularly suitable for X-ray silver halide emulsions, especially those the silver halide of which essentially consists of silver bromide with a small content of silver iodide. The invention may, however, be applied to either silver halide emulsions of the silver chloride or silver bromide type.

The invention is in particular suitable for photographic emulsions whose average grain size is relatively large.

The photographic emulsions in which the reaction products according to the invention are used, can be chemically sensitized by any of the known procedures. They can be sensitized, for example, with sulfur compounds as referred to, e.g., in the book "The Theory of the Photographic Process" by Mees (1954), pages 149–161.

The emulsions can also be chemically sensitized with salts of noble metal such as gold, ruthenium, rhodium, palladium, iridium and platinum, which are used in amounts below that which produce any substantial fog. Representative compounds are ammonium chloropalladate, potassium chloroplatinate, potassium chloroaurite, potassium aurithiocyanate, potassium chloroaurate, auric trichloride and the like. The emulsions can be sensitized with reducing agents, stannous salts or polyamines and the like. The emulsions can also be optically sensitized with cyanine, merocyanine or rhodacyanine dyes.

The emulsions can be stabilized with any of the known stabilizers, such as mercury compounds, triazoles for example mercapto phenyl triazoles, or azaindenes as described, for example, by Birr in "Z.wiss.photo." Vol. 47 (1952) pages 2 to 28. The silver halide emulsion layers may contain any suitable film-forming and water permeable colloid as binding agent, such as gelatin which can be replaced partially with products like alginic acid and derivatives thereof such as salts preferably with alkali metals, esters with lower aliphatic alcohols or amides. Further replacements are polyvinyl alcohol, polyvinyl pyrrolidone, starch, carboxymethyl cellulose and the like.

The final emulsions containing the reaction products of the present invention show highly increased silver covering power. To be more specific with respect to covering power, for the same quantity of silver halide, large increases in maximum density and contrast can be obtained in the developed image. To test the effectiveness of the compounds of the invention, the photographic element containing the compounds is exposed in a sensitometer equipped with the neutral density $3\sqrt{2}$ wedge step. The density of the selected step is measured and the quantity of metallic silver per square meter is determined by analysis. The density divided by the quantity of silver in grams per square meter is the expression of covering power of developed silver.

The increase of the covering power is considerably higher than that produced by conventional dextrin or starch.

A further advantage of the compounds of the invention is the improvement of the effective speed of the silver halide gelatin emulsion. The compounds are photographically inert, no fogging occurs even after a long storage time under extreme conditions.

In addition, the compounds according to the invention enhance the effectiveness of the developers employed in processing, presumably because the diffusions process within the layer can be facilitated by the addition of the hydrophilic colloid. In addition, a further advantage, which was not foreseeable, is that the changes in density of the layers on transition from the wet to the dry state are reduced.

Solutions of the compounds of the present invention in water have advantageously only a low viscosity even in high concentrated solutions such as about 20% solutions.

EXAMPLE 1

A high-speed large-gram silver bromiodide gelatin emulsion having a silver iodide content of 2 mols percent and about 98% silver bromide and the ratio of silver halide to gelatin is about 1:1 is prepared in the usual way, washed and ripened to maximum sensitivity with the use of an organic sulfur compound and gold (III) chloride. Before casting, wetting agents such as 10 ml. of a 5% aqueous solution of saponine per kg. of emulsion, stabilisers and hardening agents such as 16 ml. of a 1% aqueous solution of formaldehyde per kg. of emulsions are added to the emulsion. The emulsion was divided into 5 parts. Sample A served as a control; to the other samples were added the following compounds:

Sample B.—10 g. of compound I per kg. of emulsion.
Sample C.—20 g. of compound I per kg. of emulsion.
Sample D.—10 g. of dextrin per kg. of emulsion.
Sample E.—20 g. of dextrin per kg. of emulsion.

The various portions of emulsion were then coated on a transparent support such as a sheet-like support of cellulose acetate, polyethyleneterephthalate or polycarbonate on the basis of di-bis-hydroxyphenyl alkanes and dried.

The samples were exposed in a conventional sensitometer equipped with a stepped wedge and developed for 6 minutes at 20° C. in a developer of the following composition:

| | |
|---|---|
| p-Methylaminophenol _____g__ | 3.5 |
| Sodium sulfite sicc. _____g__ | 60 |
| Hydroquinone _____g__ | 9 |
| Soda sicc. _____g__ | 40 |
| Potassium bromide _____g__ | 3.5 |
| Water to make _____ml__ | 1000 |

The results of the comparative tests are shown in the following table:

| Sample | Sensitivity | Fog | Gradation | Silver covering power |
|---|---|---|---|---|
| A | 100 | 0.13 | 2.7 | 0.24 |
| B | 100 | 0.11 | 2.6 | 0.28 |
| C | 130 | 0.10 | 2.6 | 0.30 |
| D | 100 | 0.13 | 2.7 | 0.26 |
| E | 100 | 0.10 | 2.6 | 0.29 |

The emulsion layers according to the invention have a smooth surface whereas those obtained in tests (d) and (e) have a rough and matt appearance. The above table further shows that the compounds according to the invention are superior to dextrins also as regards the increase in the silver covering power and the effective speed.

EXAMPLE 2

An emulsion similar to that described in Example 1 is made and treated in the same manner. The emulsion is divided into 5 portions. Portion A is served as a control; to the other portions were added the following ingredients:

Sample B.—10 g. of Compound IV per kg. of emulsion.
Sample C.—10 g. of Compound V per kg. of emulsion.
Sample D.—10 g. of Compound VI per kg. of emulsion.
Sample E.—20 g. of Compound VI per kg. of emulsion.

The various portions of emulsion were coated on a transparent support and dried. The samples were processed as described in Example 1.

| Sample | Emulsion sensitivity | Fog | γ-value | Maximum blackness | Silver application (g./m.²) |
|---|---|---|---|---|---|
| A | 100 | 0.13 | 2.8 | 3.08 | 11.4 |
| B | 120 | 0.12 | 2.8 | 3.08 | 11.1 |
| C | 120 | 0.09 | 2.9 | 3.10 | 11.2 |
| D | 110 | 0.10 | 2.8 | 3.02 | 11.2 |
| E | 120 | 0.11 | 2.8 | 3.05 | 10.6 |

It is apparent from the table that in spite of the application of a smaller quantity of silver, emulsions having the same maximum blackness, γ-value and even a higher sensitivity with less fogging are obtained by using the compounds according to the invention.

We claim:
1. A photographic gelatin silver halide emulsion having improved covering power containing from 5 to 50% by weight of a carboxyalkylated dextrin based on the weight of gelatin.

2. A photographic gelatin silver iodobromide emulsion having improved covering power of developed silver containing per 100 parts by weight of gelatin 5 to 50 parts by weight of a water-soluble reaction product of an aliphatic halogen carboxylic acid having between 2 to 5 carbon atoms with dextrin.

3. A photographic emulsion as defined in claim 2 in which the carboxylic acid is monochloro acetic acid.

4. A photographic element having improved covering power of developing silver comprising a support and a silver iodobromide gelatin emulsion layer containing per 100 parts by weight of gelatin 5 to 50 parts by weight of a water-soluble reaction product of an aliphatic halogen carboxylic acid having between 2 to 5 carbon atoms with dextrin.

5. A photographic element as defined in claim 4 in which the carboxylic acid is monochloro acetic acid.

References Cited

UNITED STATES PATENTS

| | | | |
|---|---|---|---|
| 3,043,691 | 7/1962 | Weyde | 96—29 |
| 3,067,033 | 12/1962 | Weyde | 96—29 |
| 3,152,906 | 10/1964 | Overman | 96—76 |
| 3,203,796 | 8/1965 | Verelst et al. | 96—83 |
| 2,148,951 | 2/1939 | Maxwell | 96—94 |
| 2,964,405 | 12/1960 | Talbot et al. | 96—113 |
| 3,011,890 | 12/1961 | Gates et al. | 96—114 |
| 3,128,187 | 4/1964 | Sagal et al. | 96—29 |
| 2,357,590 | 9/1944 | Jaffe | 96—94 |

FOREIGN PATENTS

| | | |
|---|---|---|
| 1,161,136 | 1/1964 | Germany. |
| 1,146,749 | 4/1963 | Germany. |
| 517,480 | 1/1940 | Great Britain. |
| 1,121,468 | 1/1962 | Germany. |

J. TRAVIS BROWN, *Primary Examiner.*

U.S. Cl. X.R.

96—114